March 30, 1943.　　F. G. PURINTON　　2,314,898
FLUTED SHANK FASTENER
Filed June 25, 1941
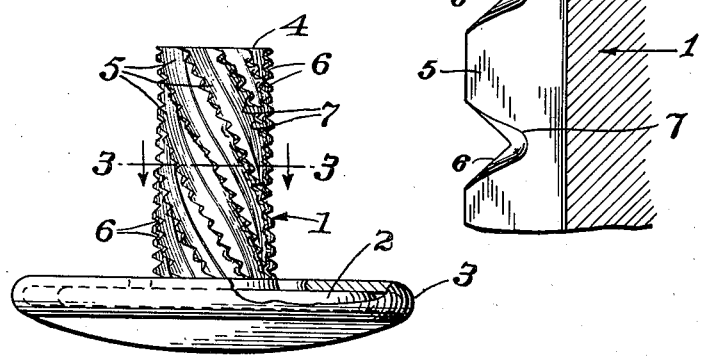
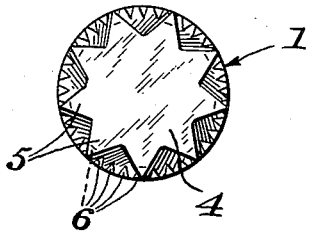
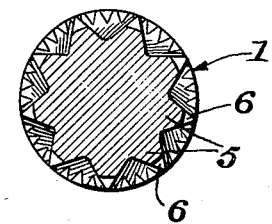
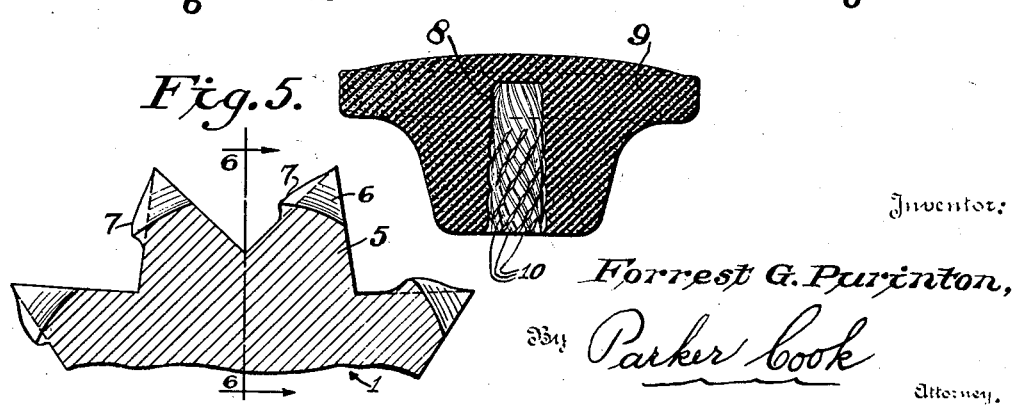
Inventor:
Forrest G. Purinton,
By Parker Cook
Attorney.

Patented Mar. 30, 1943

2,314,898

UNITED STATES PATENT OFFICE 2,314,898

FLUTED SHANK FASTENER

Forrest G. Purinton, Waterbury, Conn., assignor to The Patent Button Company, Waterbury, Conn., a corporation of Connecticut Application June 25, 1941, Serial No. 399,693

2 Claims. (Cl. 24—101)

My invention relates to new and useful improvements in fasteners and more particularly to a fluted shank fastener to be used in securing buttons to garments.

An object of the invention is to provide a tack fastener somewhat similar to the one shown in an application filed by me on April 23, 1941, bearing Serial Number 389,963 for a fluted shank fastener and also similar to the fastener shown in an application filed by me on May 1, 1941, and bearing Serial Number 391,396 for a reinforced plastic button, in which a special form of tack fastener is used.

The present invention relates to an improvement in the type of former fastener just above mentioned, so that after the fastener is once driven into its receptive means, such as a button, it will, under ordinary service, withstand any strain that may be placed on it.

A further object of the invention is to provide a tack fastener which is especially adaptable for use with buttons or similar articles made of Bakelite or similar hard plastics.

The fastener is to be driven into an opening which is several thousandths of an inch less in diameter than the diameter of the front end of the fastener.

Still another object of the invention is to form a fastener which is provided with helical flutes of the desired pitch and also with burrs or serrations on the under surface (in advance of the respective flutes) so that after the fastener is once driven into a hole of smaller diameter than the diameter of the fastener, it will necessitate a relatively hard pull to ever dislodge the fastener from the receptive means and thus provide a strong and secure fastening.

Still another object of the invention is to provide a fastener similar to the ones mentioned in the above applications but which will have a greater holding power than those above mentioned, due to the shank being slightly tapered.

Still another object of the invention is to provide a tack fastener having helical flutes, while superimposed on the flutes or formed about the shank is a plurality of serrations which in turn will leave small burrs on the under surface of the flutes similar to those shown in the applications above mentioned.

Still another object of the invention is to provide a tack with a flat end rather than conical shaped, as shown in the applications heretofore mentioned, and also to form the shank with a taper, the flat end avoiding breakage of the button during the attaching operation, and the tapered shank adding greatly to the holding power, as will be hereinafter mentioned.

With these and other objects in view the invention consists in certain new and novel arrangement and combination of parts as will be hereinafter more fully described and pointed out in the claims.

Referring now to the drawing showing a preferred embodiment,

Fig. 1 is a side elevation of my improved tack fastener;

Fig. 2 is a top plan view of the shank;

Fig. 3 is a section taken on line 3—3 of Fig. 1;

Fig. 4 is a sectional view of a button with which the fastener has been used efficiently, and forcibly withdrawn, for the sake of illustration.

Fig. 5 is a fragmentary sectional view on an enlarged scale of the shank showing the burrs on the under or forward face of the flutes; and Fig. 6 is a sectional view taken on line 6—6 of Fig. 5.

Referring now more particularly to the drawing, and for the moment to Fig. 1, there is shown the fastener consisting of the metal shank 1, which is headed as at 2, while over the head is placed the ornamental cap as shown at 3.

It will be noticed that the forward end of the shank 4 is not pointed but is cut off to form a flat surface at right angles with the central axis of the shank. It is also to be noted that the shank tapers from its end 4 to its base and I have found that a taper of about five thousandths of an inch is the most efficient.

The shank 1 is also fluted to provide a series of helical ridges 5 and in the present instance I have shown nine of these ridges or flutes.

I have also found that the pitch of the helix is preferably about 30°. Of course, the pitch may be varied if desired and in the same way the number of flutes may be increased or decreased.

Furthermore, there is shown a plurality of lateral grooves 6 superimposed on the longitudinal or helical ridges or flutes 5. These grooves are preferably formed with knurling rolls and I have found that when these grooves are cut there will be small burrs 7 formed on the under sides of the flutes. These burrs in turn will be forced against the grooves cut in the Bakelite during the driving of the fastener into its opening so that the burrs will also act as a resistance in preventing the pull of the tack or fastener from its button, as mentioned in the former applications.

These lateral grooves 6 are cut to a depth of .0035" (35/10000) deep from the ridge of the flute, and are somewhat difficult to see with the naked eye. However, under a magnifying glass it will be seen that relatively heavy burrs are drawn out from the underside of the flutes, and they are formed in such a way that they offer a great resistance to a pulling action after having been forced into the hole of the Bakelite button. The burrs are relatively sharp and can easily cut their way into the walls about the button opening.

These burrs 7 may be seen more in detail in

Figs. 5 and 6 where they are greatly enlarged for the sake of clearness of illustration. It will be understood that when the cutter is moved across the shank at right angles, it will pass through the edges of the ridges or flutes 5, and will leave a clean cut or kerf where the cutter enters the metal of the ridge or flute, but in passing out on the opposite side of the ridge, small burrs 7 will be formed. These resultant burrs are always formed to a greater or lesser extent where a cutter passes through metal and the far side—that is, the side at which the cutter emerges generally has to be filed or smoothed after the cutter emerges.

In the present instance, however, this formation of the burrs is important, and greatly adds to the holding power of the fastener.

So far it will be seen that the invention follows the tack shown in my former application, Serial Number 389,963, with the exception that in the present fastener there is shown the flat-ended shank with the tapering side walls. These two changes, however, have made a more efficient fastener than those referred to above.

Heretofore a slender pointed fastener has generally been used for attaching tack buttons, as the slender point would pierce the threads of the fabric and stretch them apart during the attaching operation so that no threads were cut. However, when the fastener had a conical end of 60° or 90° I found that it cut a hole in the cloth larger than the hole punched by a flat-end tack like that shown in the present application, and I also found that no matter how small in diameter the cone point, the base thereof was always increased by the thickness of the cloth, and this larger cone base (metal plus cloth) at times had a tendency to burst the hub of the button to which it was being attached.

However, by using a flat-end tack, as shown, the tendency to burst the button has been entirely remedied.

Also, by cutting off tacks with a flat end, it saves a further operation of pointing.

Again, I have found that by tapering the side walls of the shank from the end to the base, the holding power of the tack is greatly enhanced, and whereas a straight shank of this nature may resist a 130 pound pull—by providing the tapered side wall the shank can now resist about 200 pound pull.

The tapering of the side walls does not have any tendency to break the hub of a button as might be supposed. It is believed that when the cross-corrugations or longitudinal grooves are present, each burr on the under side of the flute broaches its way through the reversely fluted cylindrical opening 8 in the button 9 and the fastener being tapered slightly toward the base causes each burr near the base to cut a little deeper into the Bakelite than the one preceding it.

In other words, the high holding power is obtained by the great multiplicity of small burrs or projections that dig into the Bakelite. The holding power of a few would not be of any appreciable advantage, but their combined sum provides great holding power. Thus, by providing a multiplicity of burrs on the under side of each flute and then multiplying this by nine, there is a holding power which will resist substantially a 200-pound pull.

If the sides were not tapered, and the burrs on each flute stuck out the same amount, then the first burr point would broach a groove through which the other burrs would follow without being able to take hold, but when each succeeding burr projects farther from the flute than the one preceding, then each burr assists in the holding power of the fastener.

As shown in Fig. 4, the button 9, with which the fastener is especially efficient, preferably has helical grooves 10 cut in the opening 8 and extending in the opposite direction from the flutes 5 of the fastener.

This holding action might not be true if the button with which the tack was to be used were made of steel which, of course, has a certain amount of elasticity; and possibly it would not work with any material having any degree of cold flow. However, when the fastener is used with Bakelite or other similar plastics which have no elasticity, the slightly tapered side walls are a great improvement over a shank having straight side walls.

The button may be of any shape or size and preferably made of Bakelite and provided with an opening in its hub of slightly less diameter than the smallest diameter of the shank; and the opening in the hub may have ridges formed therein, as shown in my application Serial Number 391,396, these ridges or grooves being opposite in direction to the helical grooves of the fastener.

From the foregoing it will be seen that I have provided a tack fastener especially adaptable for Bakelite buttons which buttons have a central grooved opening in their hubs to receive the tack fastener. It will also be seen that by providing the flat-end shank a clean-cut hole will be formed in the garment and the cloth cut will be forced ahead of rather than over the end of the tack, which latter condition would have a tendency to split the button.

Lastly, by tapering the fluted side walls of the shank and superimposing the lateral grooves, which grooves have burrs or slight projections formed on the under side of the flutes, the holding power of the tack has been greatly enhanced.

Having thus described my invention, what I claim as new and desire to secure by Letters Patent is:

1. A metal headed fastener including a shank, the said shank being squared at its forward end, the said shank also provided with helical flutes, a plurality of spaced circumferential grooves cut into said flutes, resultant burrs on the under surface only of the said flutes to thereby add to the holding power of the fastener after being driven into an opening of slightly less diameter than the diameter of the shank of the fastener, and the side walls of the shank tapering slightly outwardly from its forward end to its head.

2. A metal headed fastener, including a shank, the said shank being blunt at its forward end, the said shank also provided with helical flutes extending substantially throughout its length, a plurality of spaced minute circumferential grooves cut into said flutes; resultant burrs formed on the under surface only of said flutes and extending about the grooves; the burrs being most pronounced at the bottom wall of the grooves; the said flutes adding to the holding power of the fastener after the same has been driven into an opening of slightly less diameter than the diameter of the shank fastener.

FORREST G. PURINTON.